United States Patent
Yang et al.

(10) Patent No.: US 11,782,188 B2
(45) Date of Patent: Oct. 10, 2023

(54) MICROWAVE RAIN ATTENUATION LAW BASED ARTIFICIAL RAINFALL EXPERIMENTAL METHOD WITH ADJUSTABLE LINK LENGTH

(71) Applicant: HOHE UNIVERSITY, Nanjing (CN)

(72) Inventors: Tao Yang, Nanjing (CN); Xin Zheng, Nanjing (CN); Pengfei Shi, Nanjing (CN); Lina Chou, Nanjing (CN); Youwei Qin, Nanjing (CN); Zhenya Li, Nanjing (CN); Xudong Zhou, Nanjing (CN)

(73) Assignee: HOHE UNIVERSITY, Nanjing (CN)

( * ) Notice: Subject to any disclaimer, the term of this patent is extended or adjusted under 35 U.S.C. 154(b) by 417 days.

(21) Appl. No.: 17/235,768

(22) Filed: Apr. 20, 2021

(65) Prior Publication Data

US 2021/0263188 A1    Aug. 26, 2021

Related U.S. Application Data

(63) Continuation-in-part of application No. PCT/CN2020/114396, filed on Sep. 10, 2020.

(51) Int. Cl.
*G01W 1/14* (2006.01)
*H05B 6/68* (2006.01)

(52) U.S. Cl.
CPC .............. *G01W 1/14* (2013.01); *H05B 6/686* (2013.01)

(58) Field of Classification Search
None
See application file for complete search history.

(56) References Cited

U.S. PATENT DOCUMENTS

| 10,649,070 B2 * | 5/2020 | Liu | G01S 7/40 |
| 2018/0106887 A1 * | 4/2018 | Choi | G01S 7/40 |

* cited by examiner

*Primary Examiner* — Brandi N Hopkins
*Assistant Examiner* — Nigel H Plumb
(74) *Attorney, Agent, or Firm* — CBM PATENT CONSULTING, LLC

(57) ABSTRACT

The invention discloses a microwave rain attenuation law based artificial rainfall experimental method with an adjustable link length, including the following steps of: 1) designing and calculating rainfall intensities in different return periods to form an experimental rainfall process, and simulating artificial rainfall by using an artificial rainfall hall; 2) building a corner reflector to dynamically adjust the microwave link length; 3) installing an experimental microwave device, and selecting a microwave link with a specific microwave frequency band as an experimental link; 4) using a self-recording rain gauge to obtain measured data on the experimental link under different rainfall intensities; and 5) according to the measured data, obtaining a whole process of the experimental rainfall intensity change, and analyzing and calculating the microwave rain attenuation law.

6 Claims, 4 Drawing Sheets

MICROWAVE RAIN ATTENUATION LAW BASED ARTIFICIAL RAINFALL EXPERIMENTAL METHOD WITH ADJUSTABLE LINK LENGTH

This application is the continuation-in-part application of International Application No. PCT/CN2020/114396 filed on 10 Sep. 2020 which designated the U.S. and claims priority to Chinese Application Nos. CN202010099561.7 filed on 18 Feb. 2020, the entire contents of each of which are hereby incorporated by reference.

TECHNICAL FIELD

The present invention relates to a microwave rain attenuation law based artificial rainfall experimental method, and more particularly, to a microwave rain attenuation law based artificial rainfall experimental method with an adjustable link length.

BACKGROUND

China began research on microwave link precipitation inversion in 2010, but the research on microwave link rainfall inversion is still very weak. Because communications between radio microwave base stations in China mainly depend on optical fibers, which lacks actual measured data of microwave rain attenuation under different meteorological conditions, and cannot provide scientific and effective rain attenuation inversion parameters for radio microwave precipitation inversion in China. Therefore, it is urgent to carry out experimental research on microwave link rainfall inversion. Using the existing radio base stations to carry out rain attenuation experiments under natural conditions has the disadvantages of long time, large investment and limited precipitation conditions, and cannot obtain effective inversion parameters. Using an artificial rainfall device to carry out research on the microwave link rainfall inversion can be designed different rainfall intensities and save time and cost. However, limited by an artificial rainfall site (a length and a width are usually less than 100 m), there is a big difference between an experimental link length and an actual communication link length, which leads to unobvious microwave attenuation and cannot reflect a real rain attenuation law under the actual microwave link, and is necessary to manually adjust the microwave link length to be consistent with the actual situation as much as possible to ensure scientificity and authenticity of experimental results.

SUMMARY

Objective of the present invention: a technical problem to be solved by the present invention is to provide a microwave rain attenuation law based artificial rainfall experimental method with an adjustable link length aiming at the defects and deficiencies of the existing microwave rain attenuation based artificial rainfall and natural rainfall experiments, and aiming at simulating microwave rain attenuation of an actual communication link length under rainfall conditions in different return periods, and providing a scientific experimental method for revealing an actual microwave rain attenuation law.

Technical solutions: the microwave rain attenuation law based artificial rainfall experimental method with the adjustable link length according to the present invention includes the following steps of:

(1) designing and calculating rainfall intensities in different return periods to form an experimental rainfall process, and simulating artificial rainfall by using an artificial rainfall hall;
(2) building a corner reflector and adjusting an arrangement point and an emission angle of the corner reflector to dynamically adjust the microwave link length;
(3) installing an experimental microwave device, and selecting a microwave link with a specific microwave frequency band as an experimental link;
(4) using a self-recording rain gauge to obtain measured data on the experimental link under different rainfall intensities; and
(5) according to the measured data, obtaining a whole process of the experimental rainfall intensity change, and analyzing and calculating the microwave rain attenuation law.

Further, step (1) particularly includes: calculating the rainfall intensity needed by the experiment by using Chicago rainstorm formula conforming to an experimental region, and simulating the artificial rainfall through an artificial rainfall system in the artificial rainfall hall.

Further, the corner reflector is a rotatable corner reflector, each surface of the corner reflector is composed of a plurality of metal sheets capable of rotating freely, and a reflection angle and an effective reflection area of the corner reflector are changed by controlling rotation of the metal sheets, thereby changing a reflection length of the microwave link.

Further, the microwave frequency band in step (3) ranges from 15 GHz to 27.5 GHz.

Further, step (4) particularly includes:
(1) using an average value of reception levels in a critical period before the rainfall as a reference value for rain attenuation calculation;
(2) adjusting a communication frequency once every one hour, the experiments in each frequency band being relatively independent from an aspect of time, and sampling the reception levels once every 10 seconds; and
(3) according to the measured data of the self-recording rain gauge, obtaining the whole process of the experimental rainfall intensity change.

Further, a process of obtaining the rainfall intensity in step (5) is:

$$\gamma = AR^B$$

in the formula, R is the rainfall intensity, $\gamma$ is the rain attenuation, and A and B are frequency-compliance coefficients, which are determined by a working frequency meter and a polarization mode of a radio wave and a radio wave receiving condition.

Beneficial effects: according to the present invention, a microwave rain attenuation process under different rain intensities and different link lengths is simulated in an artificial rainfall device to excavate and analyze the microwave rain attenuation law, which provides accurate and reliable first-hand experimental data for revealing the real microwave rain attenuation law, and lays a good foundation for realizing accurate precipitation monitoring.

DETAILED DESCRIPTION

Figure 1:
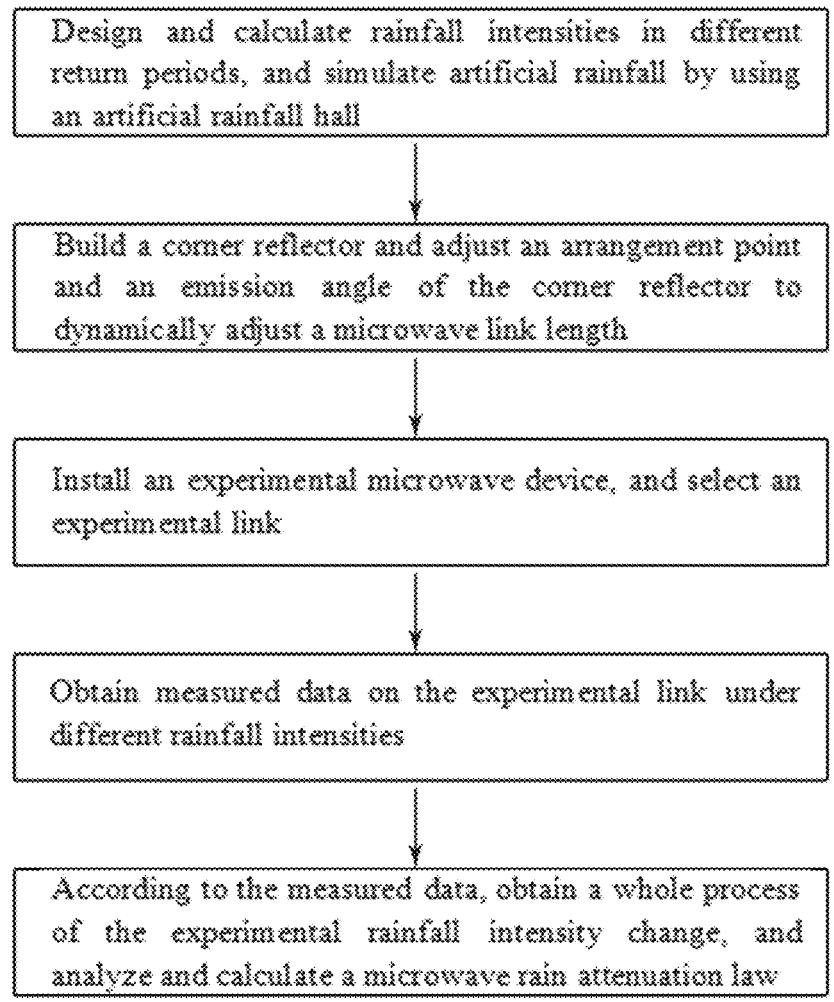
FIG. 1 is a flow chart of the method.

A specific flow of the embodiment of the present invention is as shown in FIG. 1, particularly as follows.

In step 1, rainfall intensities in different return periods were designed, artificial rainfall was simulated in an artificial rainfall hall, and a microwave rain attenuation law under different rainfall intensities was studied.

The artificial rainfall intensity of this experiment is calculated according to relevant specifications, specifically as follows: calculating the rainfall intensity needed by the experiment by using Chicago rainstorm formula conforming to an experimental region, and simulating the artificial rainfall through an artificial rainfall system in the artificial rainfall hall. The rainfall intensity of the artificial rainfall system may be controlled from 0 mm/h to 300 mm/h.

The Chicago rainstorm formula is as shown in the formula below:

$$i = \frac{A(1 + C\log_{10} P)}{167(t+b)^c}$$

wherein, A, b, C, and c represent local parameters of the rainstorm intensity formula;

P—return period, a;
t—rainfall duration, min; and
I—rainfall intensity, mm/min.

According to Nanjing rainstorm intensity formula, Nanjing rainstorm intensity formula was combined with Chicago rainstorm intensity formula to calculate a rainfall process needed by the experiment.

Figure 2:
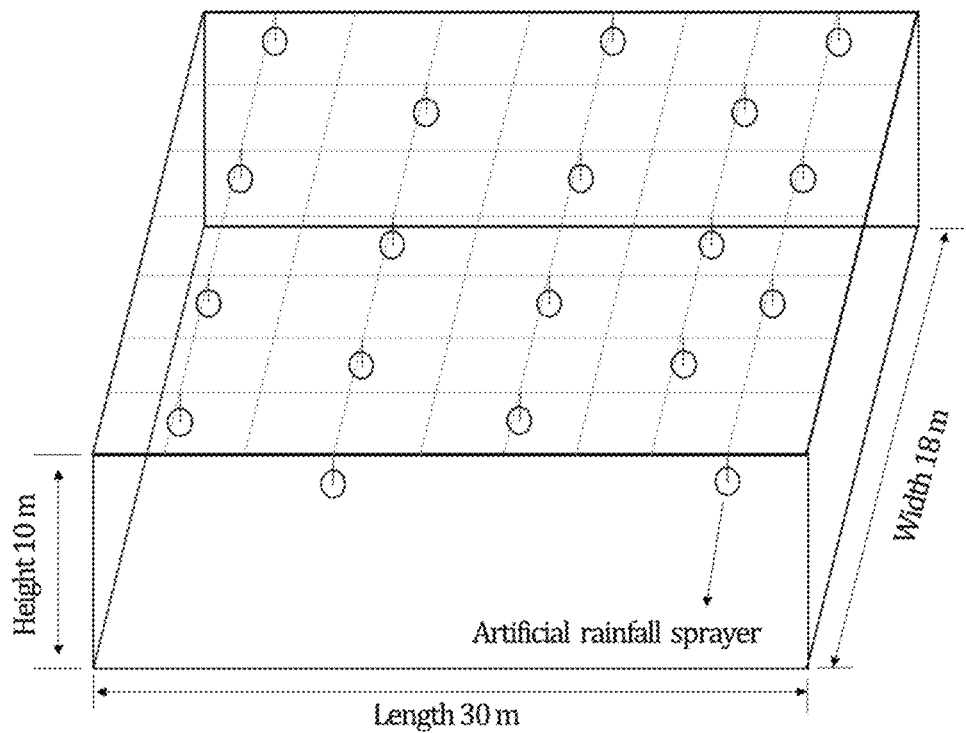
FIG. 2 is a schematic diagram of an artificial rainfall site used in the embodiment.

As shown in FIG. 2, an artificial rainfall system in a rainfall hall of the State Key Laboratory of Hydrology-Water Resources and Hydraulic Engineering, Hohai University was used in an artificial rainfall device in this embodiment to simulate rainfall processes with different design frequencies (light rain, moderate rain, heavy rain, intense rain and other rain types). The system consisted of a programmable controller, an industrial computer, an electric control valve, a spray solenoid valve and artificial rainfall measurement and control software. The rainfall intensity may be controlled according to the experimental requirements, and the rainfall intensity may be controlled from 0 mm/h to 300 mm/h.

In step 2, the microwave link length was dynamically adjusted. The microwave link length was limited by an experimental site, and the microwave link length was dynamically adjusted by the present invention by means of building a rotatable corner reflector and adjusting an arrangement point and a reflection angle of the corner reflector.

The corner reflector device was a dihedral or trihedral corner structure composed of two to three metal sheets which were perpendicular to each other. In this experiment, a rotatable dihedral corner reflector was used, each surface of the corner reflector was composed of a plurality of metal sheets capable of rotating freely, and a reflection angle and an effective reflection area of the corner reflector were changed by controlling rotation of the metal sheets, thereby changing a reflection length of the microwave link.

Figure 3:
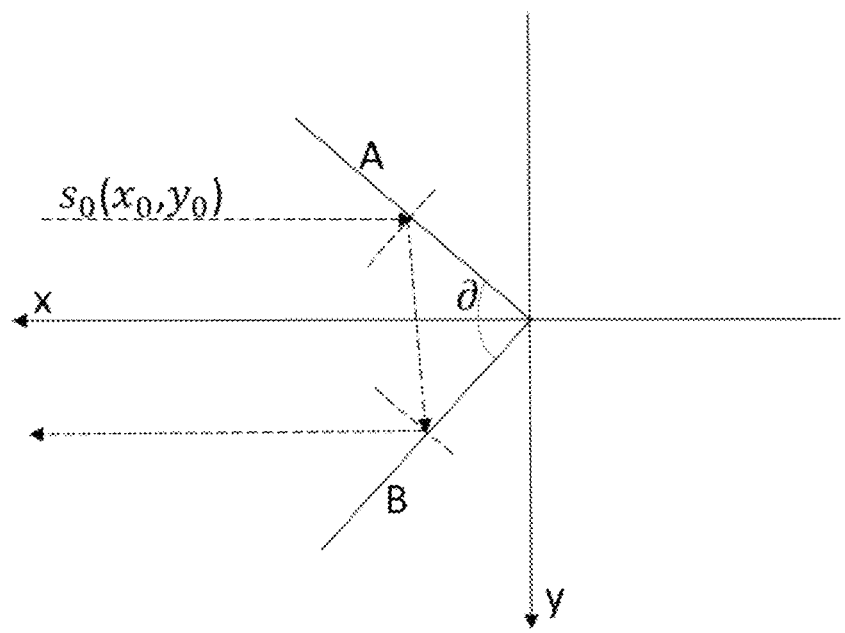
FIG. 3 is a schematic diagram of an analysis principle of a corner reflector used in the embodiment.

As shown in FIG. 3, a ray tracing method was used to trace reflection of an incident wave in the corner reflector.

(1) equation of reflecting surface: $y = k_x x$
in the formula:

$$\begin{cases} k_1 = -\cot\partial \\ k_2 = \cot\partial \end{cases}, k_1$$

was an equation of an A side, and $k_2$ was an equation of a B side;

(2) incident point ($[x_0, y_0)$ and incident wave distance $s_0$ $$x_0 = \frac{g}{k_x - k_1}, y_0 = k_x \cdot x_0$$

$$s_0 = \sqrt{(x_0 - x)^2 + (y_0 - y)^2}$$

incident angle (3)

$$\theta = \frac{\pi}{2} - \arctan\left(\frac{k_1 - k_x}{1 + k_1 k_x}\right)$$

A rain attenuation intensity was positively correlated with a link length between signal transceivers. However, an average precipitation intensity of the link was calculated by using rain attenuation measured values, and the link length was too long, which may exceed a rain cell size, so that a spatial resolution of precipitation represented by the average value of the link was too large, which could not accurately describe a change of precipitation smaller than the rain cell size. Selection of the experimental link length should be considered in combination with a testability of the rain attenuation value and the spatial resolution of precipitation measurement. A link length interval selected in this embodiment may be determined by an installation position of the corner reflector.

Figure 4:
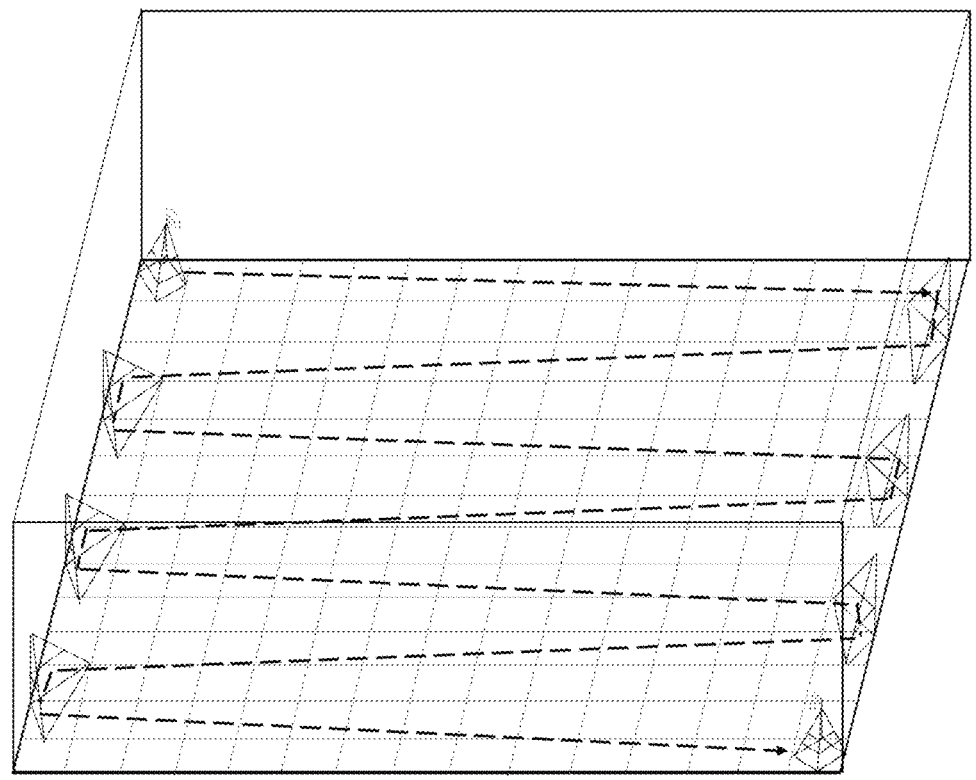
FIG. 4 is a schematic diagram of an experimental site of the embodiment.

As shown in FIG. 4, an appropriate line-of-sight communication link was adjusted through the corner reflector. In order to compare the measured data with inversion data, an RG3 self-recording rain gauge was arranged at a transmitting end for synchronous measurement.

In step 3, an experimental microwave device was installed and a microwave frequency band needed for the experiment was selected.

Rainfall is characterized by spatial heterogeneity and temporal discontinuity, so the selection of the radio microwave frequency band is very important. With the development of radio communication technologies, the fourth generation radio communication network has been widely used all over the world, and the fifth generation radio communication technology is gradually popularized and applied. A millimeter wave radio frequency band will be an important link in the application of the 5G communication network. The 2019 World Radio Communication Conference proposed that 5G communication frequency bands including 24.25 GHz to 27.5 GHz, 37 GHz to 40.5 GHz, 42.5 GHz to 43.5 GHz, 45.5 GHz to 47 GHz, 50.4 GHz to 52.6 GHz, 66 GHz to 76 GHz, as well as 81 GHz to 86 GHz, could be assigned to mobile service ends; and frequency bands including 31.8 GHz to 33.4 GHz, 40.5 GHz to 42.5 GHz as well as 47 GHz to 47.2 GHz, could be used as supplements to the mobile service ends at the later stage on the basis of the frequency band allocation at the earlier stage.

Selection of the experimental link should be considered in combination with the testability of the rain attenuation value and the spatial resolution of precipitation measurement.

According to the actual situation in China, a microwave link in a frequency range of 15 GHz to 27.5 GHz was mainly selected as the experimental link in this experiment. Theoretically, this band was sensitive to rainfall, which may also provide a basis for precipitation measurement using future commercial links and supplement shortcomings of the existing rainfall monitoring methods.

In step 4, experimental data was collected. This experiment recorded reception levels at each time on the experimental link under different rain intensities. An average value of the reception levels in a critical period before the rainfall was taken as a reference value for rain attenuation calculation, where an atmospheric temperature and a humidity at this time were basically the same as those during the rainfall, thus avoiding an attenuation error caused by different temperatures and humidities during the rainfall.

Because the experimental link length may be adjusted and controlled, the one that best meets the actual link requirements was selected. In order to study the microwave rain attenuation law at different frequency points ranging from 15 GHz to 27.5 GHz, the communication frequency was adjusted once every hour during the experiment, and the experiments in each frequency band were relatively independent from an aspect of time. To track an instantaneous change of the rain intensity accurately, a sampling frequency of the reception levels was once every 10 seconds. According to the measured data of the self-recording rain gauge, the whole process of the experiments under different rainfall intensities was obtained.

In step 5, the experimental data was analyzed, where the rain attenuation data was used to calculate the rainfall intensity by inversion according to a classical formula of a rain attenuation prediction model and based on a principle of microwave attenuation caused by rainfall, so that the microwave rain attenuation law was analyzed and calculated. In this experiment, a rain attenuation prediction model recommended in Proposal of International Telecommunication Union (ITU) was used as a theoretical basis of inversion. According to the model, the rain intensity R (mm/h) had a power law relation with the rain attenuation γ (dB):

$$\gamma = AR^B$$

in the formula, A and B were frequency-compliance coefficients, which were determined by a working frequency meter and a polarization mode of a radio wave, a radio wave receiving condition, and other factors.

What is claimed is:

1. A microwave rain attenuation law based artificial rainfall experimental method with an adjustable link length, comprising the following steps of:
   (1) designing and calculating rainfall intensities in different return periods to form an experimental rainfall process, and simulating artificial rainfall by using an artificial rainfall hall;
   (2) building a corner reflector and adjusting an arrangement point and an emission angle of the corner reflector to dynamically adjust the microwave link length;
   (3) installing an experimental microwave device, and selecting a microwave link with a specific microwave frequency band as an experimental link;
   (4) using a self-recording rain gauge to obtain measured data on the experimental link under different rainfall intensities; and
   (5) according to the measured data, obtaining a whole process of the experimental rainfall intensity change, and analyzing and calculating the microwave rain attenuation law.

2. The microwave rain attenuation law based artificial rainfall experimental method with the adjustable link length according to claim 1, wherein step (1) particularly comprises: calculating the rainfall intensity needed by the experiment by using Chicago rainstorm formula conforming to an experimental region, and simulating the artificial rainfall through an artificial rainfall system in the artificial rainfall hall.

3. The microwave rain attenuation law based artificial rainfall experimental method with the adjustable link length according to claim 1, wherein the corner reflector is a rotatable corner reflector, each surface of the corner reflector is composed of a plurality of metal sheets capable of rotating freely, and a reflection angle and an effective reflection area of the corner reflector are changed by controlling rotation of the metal sheets, thereby changing a reflection length of the microwave link.

4. The microwave rain attenuation law based artificial rainfall experimental method with the adjustable link length according to claim 1, wherein the microwave frequency band in step (3) ranges from 15 GHz to 27.5 GHz.

5. The microwave rain attenuation law based artificial rainfall experimental method with the adjustable link length according to claim 1, wherein step (4) particularly comprises:
   (1) using an average value of reception levels in a critical period before the rainfall as a reference value for rain attenuation calculation;
   (2) adjusting a communication frequency once every one hour, the experiments in each frequency band being relatively independent from an aspect of time, and sampling the reception levels once every 10 seconds; and
   (3) according to the measured data of the self-recording rain gauge, obtaining the whole process of the experimental rainfall intensity change.

6. The microwave rain attenuation law based artificial rainfall experimental method with the adjustable link length according to claim 1, wherein a process of obtaining the rainfall intensity in step (5) is:

$$\gamma = AR^B$$

in the formula, R is the rainfall intensity, γ is the rain attenuation, and A and B are frequency-compliance coefficients, which are determined by a working frequency meter and a polarization mode of a radio wave and a radio wave receiving condition.

* * * * *